A. J. WALKER.

Lamp Burner.

No. 2,492. Reissued Feb. 19, 1867.

Witnesses:

Chas. H. Smith

Geo. D. Walker

Inventor:

Alex J. Walker

N. PETERS, Photo-Lithographer, Washington, D. C.

United States Patent Office.

ALEXANDER J. WALKER, OF NEW YORK, N. Y., ASSIGNEE OF EMIL TRITTIN, BY MESNE ASSIGNMENTS.

*Letters Patent No.* 36,262, *dated August* 19, 1862; *reissue No.* 2,492, *dated February* 19, 1867.

IMPROVEMENT IN LAMP BURNERS.

The Schedule referred to in these Letters Patent and making part of the same.

TO ALL WHOM IT MAY CONCERN:

Be it known that EMIL TRITTIN, formerly of the city and county of Philadelphia, State of Pennsylvania, did invent a new and improved Lamp Burner; and the following is declared to be a full and exact description of the same, reference being had to the accompanying drawing, making part of this specification, in which—

Figure 5:
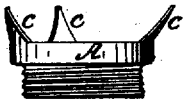

Figure 5 an elevation of the base A of the burner.

Similar letters of reference indicate corresponding parts in the several figures.

This invention consists in forming the wick tube of the burner of two parts, connected together in such a manner that the upper part will be insulated from the lower part, and the wick-tube thereby prevented from conducting heat down to the fountain or reservoir of the lamp, so as to prevent an undue evaporation or volatilization of the oil, and consequently a too copious supply of vapor to the flame. The invention also consists in a novel way of fitting the cone or jacket of the burner, whereby the former is insulated from the latter, and heat prevented from being conducted below to the fountain. This invention is specially adapted to the burning of coal oil without a chimney, and without the emission of smoke or an unpleasant odor.

Figure 1:
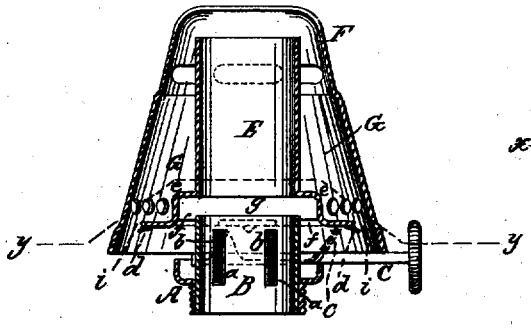
Figure 1 is a vertical central section of said burner, taken in the line *x x* of fig. 3.
Figure 3:
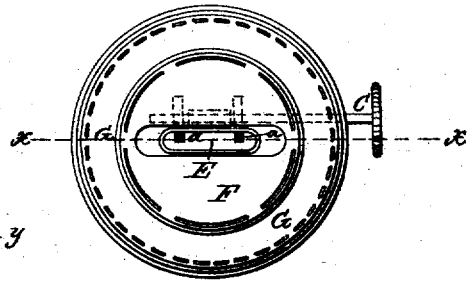
Figure 3 is a plan or top view of the same.
Figure 2:
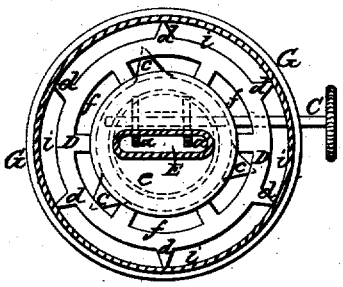
Figure 2 is a horizontal section of the same, taken in the line *y y* of fig. 1.
Figure 4:
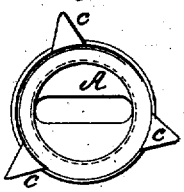
Figure 4 is a plan.

To enable others skilled in the art to fully understand and construct the said invention, it is described as follows:

A represents the base or lower part of the burner, which is screwed to the fountain of the lamp, and B represents the lower part of the wick-tube, which is secured vertically and centrally in the base A, and has a bearing attached to it for a rod, C, on which two serrated wheels *a a* are placed to raise and lower the wick, said wheels passing through slots *b* in the wick-tube B as usual. The upper part of A is formed of a series of points, *c*, to the ends of which a plate, D, is attached, the periphery of which is provided with a series of points, *d*. These points *d* connect with the cone G of the burner, as shown clearly in fig. 2, leaving a series of long and narrow openings between the inner periphery of the cone and the outer edge of the plate D. At the centre of the plate D there is a circular raised ledge, *e*, to the centre of which the lower end of the upper part E of the wick-tube is attached, and in the plate D are a series of long slots, *f f*, located between the raised ledge and the points *d*, and these slots are so placed that the intervening supports come in every case opposite the central portions of the openings *i i*. The two parts B E of the wick-tube are on line with each other, and a space, *g*, is thus left between them, as shown clearly in fig. 1. By this arrangement, the upper part E of the wick-tube is insulated from the lower part B, and heat, therefore, is prevented from being conducted down to the fountain of the lamp. F represents the cone or deflector of the burner, which is of the usual form, and has a skirt or jacket, G, extending below it. This skirt or jacket is sustained by the points *d* of the plate D, (see fig. 1,) thus leaving a series of elongated openings *i i*, as before stated. By this construction, the connection between the skirt and the body of the burner is a metal plate, in which ranges of slots or openings *f f* and *i i* are formed, the several intervening supports of one range of slots coming opposite the openings of the other range of slots, so that the heat, instead of being directly conducted by direct metallic connections, is materially obstructed by the elongated slots or openings and compelled to travel in an indirect or zigzag route, and thus less heat reaches the oil receptacle. The burner thus constructed with a divided wick-tube, or one constructed of two parts, and by having the skirt or jacket fitted in the burner, as described, the oil in the fountain is kept comparatively cool, and hence the flame not supplied with an undue amount of vapor in proportion to the oxygen of the air; consequently a more perfect or complete combustion is obtained. Connecting that portion of a lamp burner, which is exposed to the direct heat of the flame, to the part in contact with the body of the lamp by a lengthened metallic connection, to lessen the heat conducted to the reservoir, is not claimed as the invention of the said TRITTIN, that being set forth in Letters Patent granted to Mills L. Callender, on the 18th day of February, 1862; but what is claimed as the invention of the said EMIL TRITTIN, and to be secured by Letters Patent, is—

1. The ranges or series of elongated openings or slots introduced into the burner, and so arranged in respect to each other that the several intervening supports of one series come opposite the openings in the next series, and thus compel the heat to traverse an indirect or zigzag route, and thereby lessen the heat conducted to the oil receptacle, substantially as set forth.

2. Constructing the wick-tube in two parts, with an open space between the upper, which is exposed to the heat of the flame, and the lower part, which is directly connected with the reservoir, the two parts being connected, substantially as herein described, so as to impede the conduction of heat from the upper part of the wick-tube to the oil in the reservoir.

Dated this seventh day of December, A. D. 1866.

ALEXANDER J. WALKER.

Witnesses:

CHAS. H. SMITH,

GEO. D. WALKER.